Oct. 18, 1960

C. C. ALSWORTH ET AL 2,956,585

COOLING SYSTEM FOR AIRBORNE VEHICLE

Filed April 8, 1957

INVENTORS:
Charles C. Alsworth
Thomas B. Martin

By Smyth & Roston
Attorneys

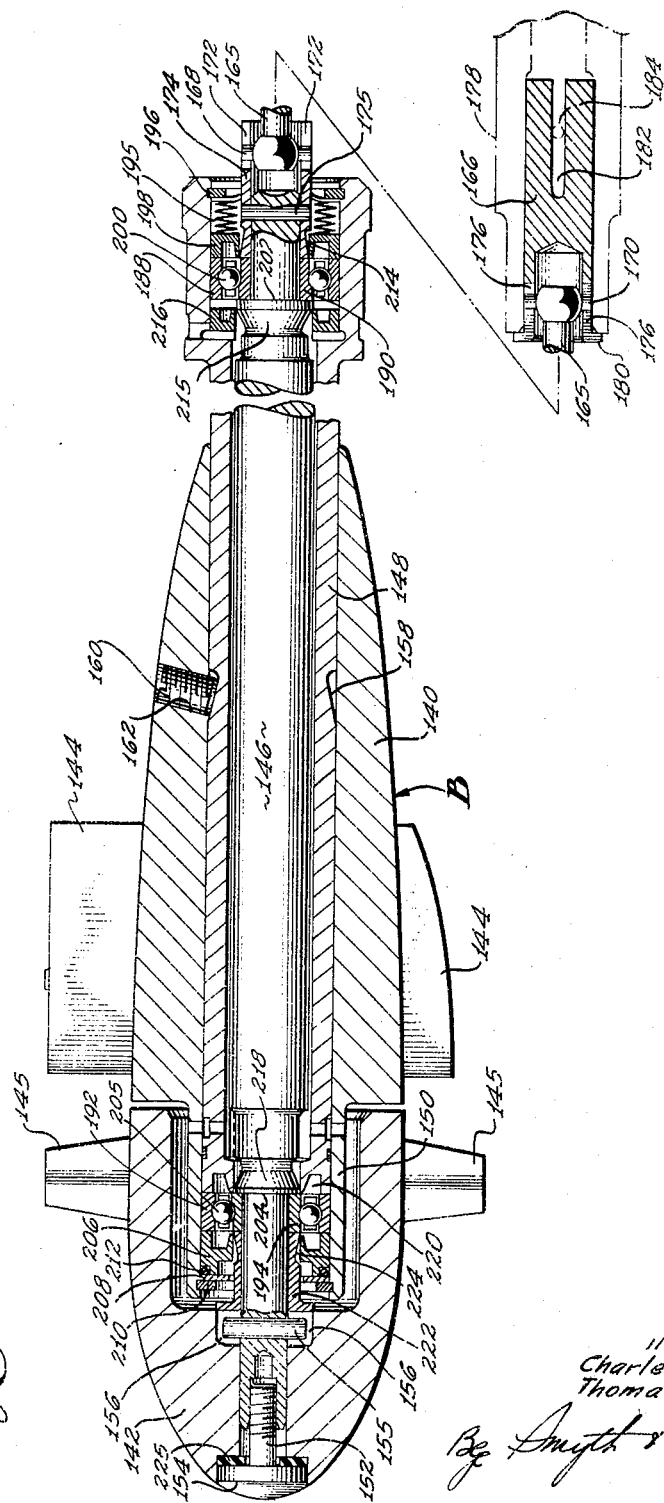

Oct. 18, 1960   C. C. ALSWORTH ET AL   2,956,585
COOLING SYSTEM FOR AIRBORNE VEHICLE
Filed April 8, 1957   4 Sheets-Sheet 3
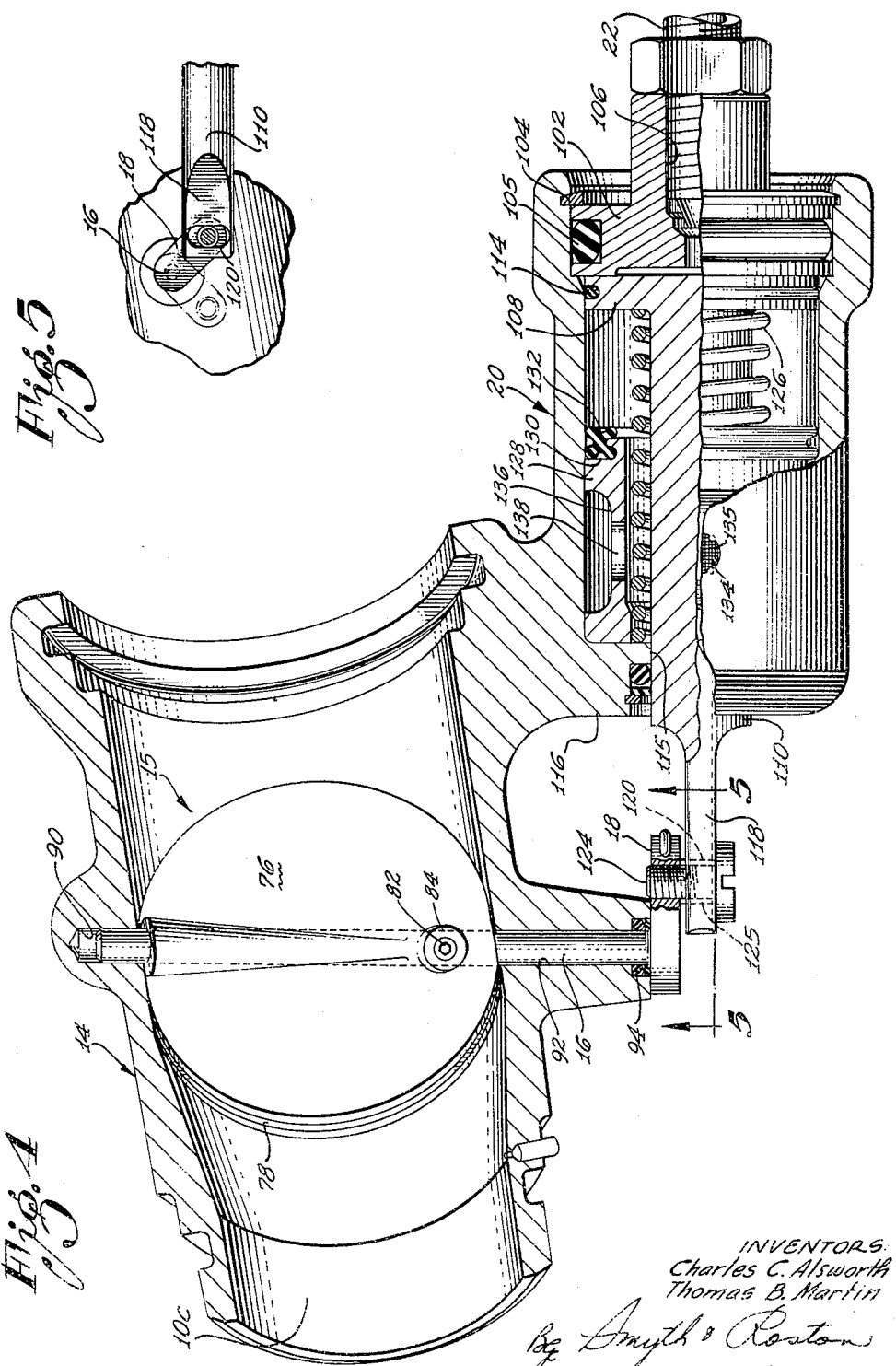
INVENTORS
Charles C. Alsworth
Thomas B. Martin
By Smyth & Roston
Attorneys

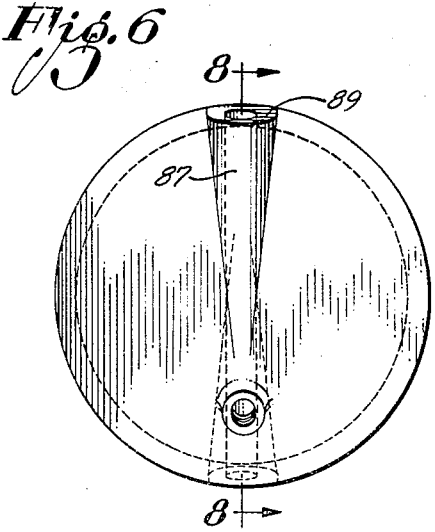
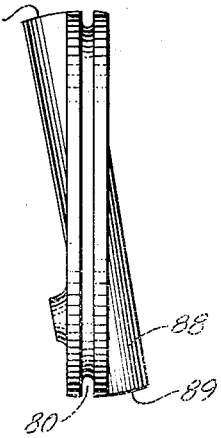
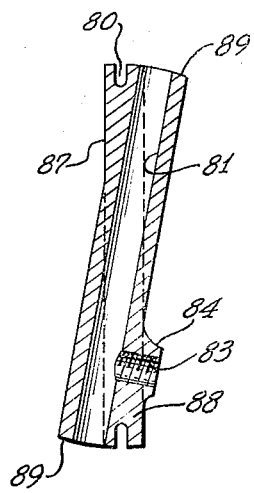

United States Patent Office 2,956,585
Patented Oct. 18, 1960

2,956,585

COOLING SYSTEM FOR AIRBORNE VEHICLE

Charles C. Alsworth, Walnut Creek, and Thomas B. Martin, Danville, Calif., assignors, by mesne assignments, to Curtiss-Wright Corporation, a corporation of Delaware Filed Apr. 8, 1957, Ser. No. 651,330

7 Claims. (Cl. 137—552)

This invention relates to means to supply cooling air to the interior of an airborne vehicle and, more particularly, refers to a cooling system employing ram air when the vehicle is in flight and providing a power-actuated blower for use when ram air is not available. For the purpose of disclosure, the invention is described herein as employed for cooling compartments that contain electronic equipment. This description will provide adequate guidance for those skilled in the art who may have occasion to apply the same principles to other specific purposes.

Compactness and saving in weight are, of course, prime considerations throughout the construction of an airborne vehicle and these considerations would dictate the use of a single passage for conveying both ram air and blower-actuated air into the compartments that are to be cooled. In such a single passage arrangement, however, the ram air would necessarily be directed through the idle blower and any efficient blower would inherently offer excessive resistance to the flow of air when the blower is idle.

The invention solves this problem by dividing a short portion of the air passage into two alternate passages, either of which may be regarded as a by-pass around the other. The blower is placed in one of these short alternate passages and the other is used for ram air flow.

Since the limited available space requires at least one abrupt change in direction of the air flow, and since it is much more important to minimize the resistance to the ram air than it is to minimize the resistance to the blower-driven air, the invention includes the further concept of minimizing the changes in direction of flow of ram air, the abrupt turn or turns being located in the alternate passage that is used by the blower-driven air. Thus, in the preferred practice of the invention, the blower is in a passage portion that forms a right angle and the ram air follows a by-pass that is a hypotenuse of a right triangle.

The described passage arrangement providing short alternate paths introduces a new problem, however, since the ram air by-pass provides a short circuit path when the blower is in operation, air tending to flow in the reverse direction through the by-pass from the high pressure zone on the output side of the blower to the lower pressure zone on the input side. The invention solves this problem by providing a remotely controlled valve to close the ram air by-pass automatically whenever the blower is placed in operation.

Any valve employed for this purpose should close in a fluid-tight manner and when opened should not cause any significant pressure drop in the stream of ram air. In this regard, a feature of the invention is the use of a special butterfly-type valve for the ram air by-pass.

As will be explained, further features of the invention relate to the construction of the blower itself, which includes a stator positioned inside the angular portion of the passage with a rotor on the upstream end of the stator. One of these features is the use of a series of radial flow-straightening vanes to support the stator and the further provision of a second series of vanes at the passage bend to turn the blower-driven air stream. Other features relate to the manner in which the rotor is mounted for actuation by a drive shaft and the manner in which the drive shaft is journaled.

The various features and advantages of the invention will be apparent from the following detailed description considered with the accompanying drawings.

In the drawings, which are to be regarded as merely illustrative:

Figure 3 is an enlarged longitudinal sectional view showing the blower and the shaft for actuating the blower;

Figure 4 is an enlarged section taken as indicated by the angular line 4—4 of Figure 2 to show the construction of the by-pass valve and the remotely controlled actuator therefor;

Figure 5 is a section taken as indicated by the line 5—5 of Figure 4 to show the manner in which the actuator is operatively connected to the by-pass valve;

Figure 6 is a face view of the butterfly valve member;

Figure 7 is an edgewise view of the same valve member; and

Figure 8 is a diametrical section of the butterfly valve member taken as indicated by the line 8—8 of Figure 6.

*General arrangement*

Figure 1:
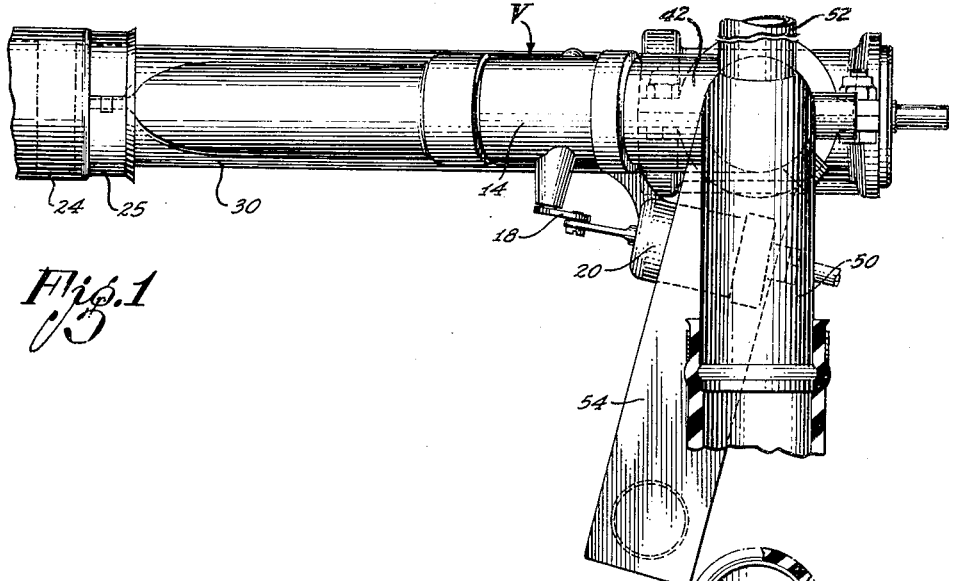
Figure 1 is a plan view of the presently preferred embodiment of the invention.
Figure 2:
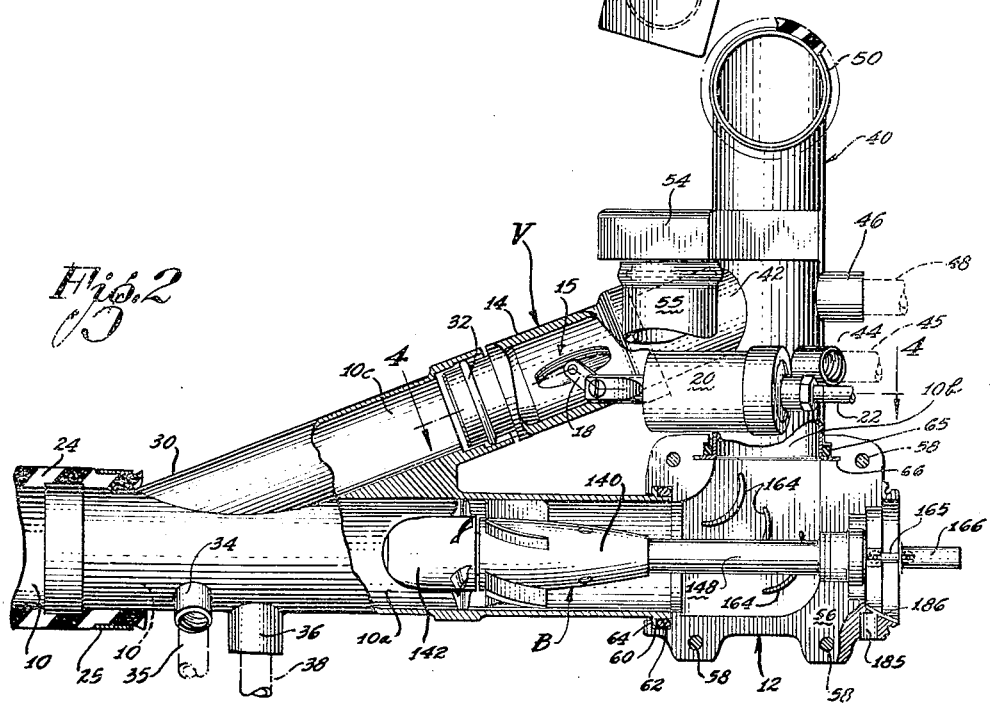
Figure 2 is a side elevation with portions of the passage walls broken away to show the construction of the blower and the construction of the by-pass valve.

Figures 1 and 2 show a cooling duct structure which provides a passage 10 for the flow of cooling air from the exterior of the airborne vehicle to a plurality of compartments therein that contain electronic components. The passage 10 has a bend, in this instance a right angle bend, provided by an elbow member 12. Thus, the passage 10 has an angular portion comprising an upstream leg 10a and a downstream leg 10b. A blower, generally designated by the Letter B, is positioned in this angular portion of the passage 10 and preferably is located in the upstream passage leg 10a.

The cooling duct structure further provides a by-pass passage 10c around the angular passage portion comprising the two passage legs 10a and 10b, this by-pass being employed for flow of the ram air. The by-pass 10c conforms to a hypotenuse of a right triangle that includes the two passage legs 10a and 10b.

Part of the by-pass 10c is a housing 14 of a butterfly valve that is generally designated by the letter V. The valve V includes a butterfly valve means, generally designated 15, inside the by-pass passage 10c and is suitably adapted for remote control. In the present embodiment of the invention, the butterfly valve means 15 is mounted on a spindle 16 which extends to the exterior of the passage structure and carries a crank arm 18 on its outer end. The crank arm 18 is controlled by a power cylinder 20 that is connected by tubing 22 to a suitable source of fluid under pressure, for example, a source of compressed air.

The general manner in which the described system operates for its purpose may be readily understood. A tubular member 24 of rubber-like material is attached to the described structure by a clamp band 25 to form the portion of the passage 10 that communicates with the atmosphere and the inlet end of this passage is exposed to the exterior of the airborne vehicle in such manner as to receive ram air when the vehicle is in flight. When ram air is used the valve V is wide open to provide a path for air flow with minimum resistance and the major portion of the ram air follows this path rather than the alternate path through the idle blower B.

When it is necessary to energize the blower B to maintain the flow of cooling air through the passage 10, the power cylinder 20 is actuated by remote control to close the valve. The valve closes in a substantially air tight manner so that the only path of flow of the cooling air is through the blower, there being no opportunity for the air to recycle through the blower by reverse flow through the by-pass passage 10c.

*Passage structure*

The particular passage structure shown in Figures 1 and 2 includes a Y-member 30 that is connected to the tubular member 24. One branch of the Y-member 30 forms a portion of the by-pass passage 10c and is telescoped over the end of the valve housing 14 with the joint sealed by a suitable O-ring 32. The other branch of the Y-member 30 forms the upstream leg 10a of the angular portion of the passage 10 and is connected directly to the elbow member 12. At the juncture of the upstream leg 10a and the by-pass passage 10c, the Y-member 30 is provided with a threaded nipple 34 to receive a pressure-sensing means 35 and a second threaded nipple 36 to receive a thermocouple probe 38 or other suitable temperature sensing means. These two sensing means detect the static pressure and temperature, respectively, of the air stream on the upstream side of the blower B.

The passage structure further includes a manifold assembly, generally designated by numeral 40, that is connected to the elbow member 12 to form the downstream leg 10b of the angular portion of the passage 10. The manifold assembly 40 has a branch 42 connected to the housing 14 of the valve V to complete the by-pass passage 10c. The manifold assembly 40 has a threaded nipple 44 to receive a second pressure-sensing means 45 to ascertain the static pressure on the downstream side of the blower B and has a second threaded nipple 46 to receive a temperature-responsive means such as a thermocouple probe 48 to ascertain the temperature of the air stream on the downstream side of the blower.

In this particular embodiment of the invention, the manifold assembly 40 has three discharge outlets for distributing the cooling air to three different compartments containing electronic components. One of the discharge outlets is provided by a curved branch 50 of the manifold assembly; another discharge outlet is provided by a branch 52 positioned on the curve of the branch 50; and a third branch 54 to provide a third discharge outlet is of rectangular cross-sectional configuration and is adapted for connection to a discharge tube 55 of rubber-like material.

To permit assembly of the described passage-forming members, the elbow member 12 is made in two sections that have mating faces 56. These two sections are releasably interconnected by screws 58 with suitable gasket material (not shown) interposed to make the joint fluid tight. The elbow member 12 is formed with an opening to receive the corresponding branch of the Y-member 30 and this opening is formed with a circumferential groove 60 to receive an O-ring 62. The groove 60 receives a circumferential flange 64 of the Y-member 30 for positive engagement with the Y-member. In somewhat similar manner, the elbow member 12 has a second opening to receive the end of the manifold assembly 40 and this second opening is circumferentially grooved to seat an O-ring 65 and to engage in a positive manner a circumferential flange 66 on the end of the manifold assembly.

*Construction of the by-pass valve*

The butterfly valve means 15 of the by-pass valve V comprises a circular disc 76 with a peripheral sealing ring 78 (Figure 4) mounted in a peripheral groove 80 (Figure 7) of the disc. The sealing ring 78 provides a continuous peripheral sealing surface for sealing contact with the inner cylindrical wall of the valve housing 14 and may be made of any material suitable for this purpose. At the closed position of the butterfly valve means 15, the sealing ring 78 lies in a plane normal to the axis of the flow passage through the valve. The spindle 16, however, is canted relative to this plane and intersects the plane in the central region of the valve disc 76. Thus, one end of the spindle lies to one side of the sealing ring 78 and the other end of the spindle lies to the other side of the sealing ring. The spindle 16 extends through a bore 81 of the butterfly valve means 15 and is fixed relative to the valve means by a set screw 82. The set screw is in a threaded transverse bore 83 (Figure 8) in a boss 84 on one face of the valve disc 76 and seats in a suitable keying recess (not shown) in the valve spindle 16.

To provide adequate material for the walls of the bore 81, the disc 76 is formed with two opposite lateral enlargements 87 and 88 on the same diameter as the bore. As may be seen in Figures 6, 7 and 8, these enlargements 87 and 88 extend in opposite directions and are of tapering configuration. The periphery of the valve disc 76 is spherically curved and the spherical curvature is extended to provide spherically curved end surfaces 89 for the two enlargements 87 and 88. It is by virtue of this peripheral spherical curvature that the butterfly valve means 15 is free to rotate from a fully open position to a fully closed position with effective sealing contact with the surrounding cylindrical wall of the flow passage at its closed position.

One end of the valve spindle 16 is journaled in a blind bore 90 in the fluid passage wall and therefore affords no opportunity for fluid leakage to the exterior of the valve housing 14. The other end of the valve spindle 16 extends to the exterior of the valve housing 14 through a bore 92. An O-ring 94 prevents leakage along this bore 92.

The power cylinder 20, which is preferably integral with the valve housing 14, is closed at one end by a removable plug 102 that is held in place by a snap ring 104 and is sealed by an O-ring 105. The removable plug 102 provides a threaded port 106 which is connected to the previously mentioned tubing 22.

Slidingly mounted in the power cylinder 20 is a piston 108 having an integral piston rod 110. The piston 108 may be provided with an O-ring 114. The piston rod 110 slidingly extends through a bore 115 in an end wall 116 of the power cylinder and is operatively connected to the valve spindle 16 by the previously mentioned crank arm 18.

In the construction shown in the drawings, the piston rod 110 has a flattened end portion 118 with a transverse slot 120 therein. A headed stud 124 that is threaded into the crank arm 18 extends through the piston rod slot 120. Thus, the headed stud 124 serves as a crank pin for rotation of the valve spindle 16 through a range of 90 degrees, as indicated in Figure 5, for opening and closing the valve. Preferably, the headed stud 124 is provided with a rotatable sleeve 125 in the slot 120 to reduce friction.

It is contemplated that suitable spring means will be provided to urge the piston 108 to one of its two positions thereby to urge the butterfly valve means 15 to a corresponding position in a "fail-safe" manner. In the present embodiment of the invention, a coil spring 126 surrounding the piston rod 110 in compression between the end wall 116 and the piston 108, normally positions the piston against the removable plug 102 with the butterfly valve means 15 at its fully open position, as may be seen in Figure 4.

Any suitable means may be provided to serve as a stop for the piston 108 at its alternate valve-closing position. For example, as shown in Figure 4, a spacer ring 128 may be mounted in the power cylinder 20 against the end wall 116 for this purpose. The spacer ring 128 has an annular recess 130 at one end to seal suitable sealing means for cooperation with the piston 108. In this instance, the sealing means comprises what is known as a quad ring 132 of resilient rubber-like material. The quad ring 132 responds to the pressure of the piston 108 not only by forming a seal with the piston itself but also by forming a seal with the surrounding wall of the power cylinder 20.

The fluid-pressure-actuated movement of the piston 108 from its normal position against the plug 102 to its alternate position against the spacer ring 128 tends to compress the air in the power cylinder 20 in a region of the spacer ring 128. In the preferred practice of the invention, this second end of the power cylinder is in communication with the atmosphere through a peripheral bleeder port 134 that is spanned by filter means in the form of a sintered brass plug 135. In the construction shown, the spacer ring 128 has a wide peripheral groove 136 in the region of the bleeder port 134 and the spacer ring is further provided with at least one radial opening 138 in the bottom of this wide groove to provide the desired freedom of air flow to and from the bleeder port 134.

Normally, i.e. in the absence of the admisison of fluid pressure into the power cylinder 20 through the port 106, the piston 108 is held against the plug 102 by the spring 126 and the butterfly valve means 15 is in its open position. For closing of the valve by remote control, fluid under pressure is admitted through the port 106 to shift the piston 108 to its alternate position against the quad ring 132. At this alternate position, the sealing contact of the piston against the quad ring and the sealing contact of the quad ring against the surrounding wall of the cylinder effectively prevents leakage of the high pressure fluid beyond the quad ring. This movement of the piston 108 to its alternate position forces a corresponding quantity of air out through the bleeder port 134. The actuation of the piston 108 swings the butterfly valve means 15 to its fully closed position.

To return the butterfly valve means 15 to its normal open position, it is necessary merely to reduce the fluid pressure in the tubing line 22 connected to the port 106 of the power cylinder. Such reduction in pressure enables the spring 126 to return the piston 108 to its normal valve-opening position. It is apparent that in the event of failure of the means to supply fluid under pressure to the port 106, the butterfly valve means 15 will be automatically opened by the spring 126 in a "fail-safe" manner.

*Construction of the blower*

The blower B has a stator 140 in the form of a tapered hollow body and has a rotor 142 on the upstream end of the stator, the combined stator and rotor providing a streamlined configuration for smooth air flow. The stator 140 is supported in the upstream passage leg 10a by a series of radial vanes 144 which are of curved configuration to have a straightening effect on the whirling air stream that is created by the series of impeller blades 145 of the rotor 142.

As shown in Figure 3, the rotor 142 is mounted on an actuating shaft 146 that is enclosed by a tubular shaft housing 148. The body of the rotor 142 is hollow to enclose a cylindrical end portion 150 of the stator body 140 and the tubular shaft housing 148 extends into this cylindrical end portion. The rotor 142 is secured to the end of the blower shaft 146 by means of a screw 152 having a rounded head 154 that conforms to the rounded streamlined configuration of the rotor. The rotor is keyed to the shaft 146 by a cross pin 155 in the shaft that extends into two diametrically opposite recesses 156 in the rotor body.

The tubular shaft housing 148 is formed with a tapered circumferential shoulder 158 which is engaged by a set screw 160 in an inclined bore 162 in the body of the stator 140. The elbow member 12 provides a plurality of curved vanes 164 which serve to turn the air stream 90 degrees in a laminar manner and the tubular shaft housing 148 extends through this series of vanes to terminate in the wall of the elbow member.

The end of the blower shaft 146 is exposed outside the elbow member 12 and is connected by a coupling means 165 with an adaptor 166, which adaptor is employed to connect the blower shaft with a suitable prime mover (not shown). The coupling means 165 has two cross pins 168 and 170 at its opposite ends and one of these cross pins extends through a pair of slots 172 of an end sleeve 174 that is fixedly mounted on the end of the shaft 146 by a cross pin 175. The second cross pin 170 of the coupling means 165 engages a pair of slots 176 in the adaptor 166.

The adaptor 166 fits into the hollow end of a drive shaft 178 that is shown in phantom in Figure 3. The adaptor has a radial flange 180 to abut the end of the drive shaft and is formed with a longitudinal slot 182 to engage a cross pin 184 inside the drive shaft. Preferably, the elbow member 12 permits drainage of excess lubricant from the region of the coupling means 165. For this purpose, the elbow member 12 may have a drainage bore 185 communicating with a drainage groove 186 as shown in Figure 2.

The outer end of the blower shaft 146 at the elbow member 12 is journaled in a first roller bearing having an outer race 188 and an inner race 190 and the inner end of the blower shaft is journaled by a second ball bearing having an outer race 192 and an inner race 194. These two ball bearings are maintained in tight operating condition by a plurality of springs 195 at the outer end of the tubular shaft housing 148 that are backed against a snap ring 196. The thrust by the springs 195 is exerted through the following elements in sequence: an oil seal ring 198 adjacent the springs; the outer race 188 of the first ball bearing; the bearing balls 200; the inner race 190; a circumferential shoulder 202 of the blower shaft 146; a second circumferential shoulder 204 at the other end of the shaft; the inner race 194 of the second ball bearing; the bearing balls 205; the outer race 192; an oil seal ring 206; a washer 208; and a second snap ring 210 is the cylindrical end portion 150 of the stator 140. The washer 208 is preferably made of Teflon and the oil seal ring 206 is circumferentially recessed to seat an O-ring 212.

Tightening of the inclined set screw 160 in the body of the stator 140 tends to shift the tubular shaft housing 148 longitudinally inward towards the rotor 142 with a consequent immobilizing effect on the outer ball bearing race 192. As may be seen in Figure 3, the inward thrust of the tubular shaft housing 148 is exerted against the outer bearing race 192 to clamp the bearing race against the adjacent oil seal ring 206.

The blower shaft 146 is provided with means to prevent the migration of lubricating oil away from the two ball bearings. For this purpose, the shaft is provided with tapered shoulders to serve as centrifugal oil slingers in cooperation with adjacent annular spaces in a well known manner. A tapered portion 214 of the blower shaft on one side of the first ball bearing throws lubricant into the annular space provided by the oil sealing ring 198 and a tapered portion 215 of the shaft on the other side of the ball bearing throws lubricant into a similar annular space provided by an oil seal ring 216. At the other end of the shaft, a tapered portion 218 on one side of the second ball bearing throws lubricant into an annular space provided by a groove 220 in the end of the tubular shaft housing 148 and a sleeve 222 on the shaft has a tapered portion 224 on the other side of the ball bearing to throw oil into the annular space provided by the oil seal ring 208.

One end of the sleeve 222 abuts the inner bearing race 194 and the other end abuts the body of the rotor 142. Thus, tightening the screw 152 at the end of the rotor clamps the inner bearing race 194 between the sleeve 222 and the shaft shoulder 204 to immobilize the inner bearing race relative to the shaft. Preferably, the head 154 of the screw 152 backs against a resilient washer 225 that yields sufficiently to permit this clamping action.

Our description in specific detail of the selected embodiments of the invention will suggest various changes, substitutions and other departures from our disclosure within the spirit and scope of the appended claims.

We claim:

1. Means to propel a gaseous fluid through a passage having two legs forming a substantially right angle bend, said propelling means comprising: a rotor positioned in one of said legs co-axially thereof with peripheral blades to drive the air towards said bend; a drive shaft carrying said rotor and extending along the axis of said one leg and out through the wall of the intake passage at the bend to receive power for driving the rotor; means enclosing said shaft throughout the distance from said rotor to said wall to prevent disturbance of the airstream by the rotating shaft; stator vanes on said enclosing means extending radially outward therefrom to support the inner end thereof, said vanes being curved to have a straightening effect on the airstream; bearing means in said enclosing means journalling said shaft adjacent said rotor; and a plurality of curved vanes in said bend of the intake passage to turn the flowing air in a substantially laminar manner.

2. Means to propel a gaseous fluid through a passage having two legs forming a substantially right angle bend, said propelling means comprising: a rotor positioned in one of said legs co-axially thereof with peripheral blades to drive the air towards said bend; a drive shaft carrying said rotor and extending along the axis of said one leg and out through the wall of the intake passage at the bend to receive power for driving the rotor; means inside said one leg enclosing said shaft; stator vanes on said enclosing means extending radially outward therefrom to support the inner end thereof, said vanes being curved to have a straightening effect on the airstream; bearing means in said enclosing means journalling said shaft adjacent said rotor; a plurality of curved vanes in said bend of the intake passage to turn the flowing air in a substantially laminar manner; a pair of pressure-sensing means for said passage positioned upstream and downstream from said blower means to ascertain the pressure differential across the blower means for indication of the working order thereof; a pair of temperature-sensing means for said intake passage positioned upstream and downstream from said blower means to ascertain the temperature differential across the blower means for detection of excessive mechanical friction in the operation of the blower means.

3. Means to propel a gaseous fluid through a passage having two legs forming a substantially right angle bend, said propelling means comprising: a rotor positioned in one of said legs co-axially thereof with peripheral blades to drive the air towards said bend; a drive shaft carrying said rotor and extending along the axis of said one leg and out through the wall of the intake passage at the bend to receive power for driving the rotor; means inside said one leg enclosing said shaft; stator vanes on said enclosing means extending radially outward therefrom to support the inner end of the enclosing means, said vanes being curved to have a straightening effect on the airstream; bearing means in said enclosing means journalling said shaft adjacent said rotor; two temperature-sensing means for said intake passage positioned upstream and downstream from said blower means to ascertain the temperature differential across the blower means for detection of excessive mechanical friction in the operation of the blower means.

4. Means to propel a gaseous fluid through a passage having two legs forming a substantially right angle bend, said propelling means comprising: a rotor positioned in one of said legs co-axially thereof with peripheral blades to drive the air towards said bend; a drive shaft carrying said rotor and extending along the axis of said one leg and out through the wall of the intake passage at the bend to receive power for driving the rotor; means inside one leg enclosing said shaft; stator vanes on said enclosing means extending radially outward therefrom to support the inner end thereof, said vanes being curved to have a straightening effect on the airstream; bearing means in said enclosing means journalling said shaft adjacent said rotor; two pressure-sensing means for said passage positioned upstream and downstream from said blower means to ascertain the pressure differential across the blower means for indication of the working order thereof.

5. Means to propel a gaseous fluid through a passage having two legs forming a substantially right angle bend, said propelling means comprising: a rotor positioned axially in one of said legs with peripheral blades to drive the air towards said bend; a drive shaft carrying said rotor and extending along the axis of said one leg and out through the wall of the intake passage at the bend to receive power for driving the rotor, said shaft having a pair of shoulders facing towards its opposite ends; means enclosing said shaft throughout the distance from said rotor to said wall to prevent disturbance of the airstream by the rotating shaft; stator vanes on said enclosing means extending radially outward therefrom to support the inner end thereof, said vanes being curved to have a straightening effect on the airstream; a first bearing for said shaft in said enclosing means near said wall of the bend; a second bearing for said shaft in said enclosing means near said rotor; yielding means in said enclosing means near the outer end thereof, each of said bearings having an outer race and an inner race, said inner races abutting said pair of shoulders respectively, said yielding means thrusting against the outer race of said first bearing and the outer race of said second bearing thrusting against said stator whereby said yielding means stresses both said bearings.

6. Means to propel a gaseous fluid through a passage having two legs forming a substantially right angle bend, said propelling means comprising: a drive shaft in one of said legs extending longitudinally thereof and out through the wall of said bend; means enclosing said shaft to prevent disturbance of the airstream by the rotating shaft, said enclosing means having an inner end portion of reduced dimension in cross section; a round-nosed rotor on the inner end of said shaft having a cylindrical skirt surrounding said inner end portion of the enclosing means, said skirt having a circumferential series of peripheral impeller blades; bearing means in said inner end portion journalling the inner end of said shaft inside said skirt in the region of the plane of rotation of said blades; stator vanes on said enclosing means extending radially outward therefrom to support the inner end thereof, said vanes being curved to have a straightening effect on the airstream; bearing means in said enclosing means journalling said shaft in the region of said wall of the bend; and a plurality of curved vanes in said bend of the intake passage to turn the flowing air in a substantially laminar manner.

7. Means to propel a gaseous fluid through a passage having two legs forming a substantially right angle bend, said propelling means comprising: a drive shaft in one of said legs extending longitudinally thereof and out through the wall of said bend; means enclosing said shaft to prevent disturbance of the airstream by the rotating shaft; a round-nosed rotor on the inner end of said shaft having a cylindrical skirt surrounding the inner end of said enclosing means, said skirt having a circumferential series of peripheral impeller blades; a first bearing in said enclosing means inside said skirt journalling the inner end of said shaft in the region of the plane of rotation of said blades; a second bearing in said enclosing means journalling the outer end of said shaft, each of said bearings having an outer race and an inner race, said shaft having two shoulders facing axially away from each other in abutment with said inner races, respectively; yielding means thrusting against the outer race of said first bearing and the outer race of said second bearing thrusting against said enclosing means whereby the yielding means stresses both said bearings; stator vanes on said enclosing means extending radially outward therefrom to support the inner end of the enclosing means, said vanes being curved to have a straightening effect on the airstream; and a plurality of curved vanes in said bend of the intake passage to turn the flowing air in a substantially laminar manner.

References Cited in the file of this patent

UNITED STATES PATENTS

| | | |
|---|---|---|
| 899,201 | Braybrook | Sept. 22, 1908 |
| 1,383,719 | Halvorsen et al. | July 5, 1921 |
| 1,671,069 | De Wein | May 22, 1928 |
| 1,940,455 | Kilpela | Dec. 19, 1933 |
| 2,313,149 | Jacobsson | Mar. 9, 1943 |
| 2,394,517 | Ingalls | Feb. 5, 1946 |
| 2,396,116 | Noxon | Mar. 5, 1946 |
| 2,412,110 | Williams | Dec. 3, 1946 |
| 2,552,118 | Sawyer | May 8, 1951 |
| 2,703,674 | Wood | Mar. 8, 1955 |
| 2,815,705 | Jensen | Dec. 10, 1957 |

FOREIGN PATENTS

| | | |
|---|---|---|
| 689,265 | Great Britain | Mar. 25, 1953 |